US009498860B2

(12) United States Patent
Takahashi

(10) Patent No.: US 9,498,860 B2
(45) Date of Patent: Nov. 22, 2016

(54) ROBOT AND ABUTMENT MEMBER FOR ROBOT

(71) Applicant: Seiko Epson Corporation, Tokyo (JP)

(72) Inventor: Masaru Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 58 days.

(21) Appl. No.: 14/515,819

(22) Filed: Oct. 16, 2014

(65) Prior Publication Data

US 2015/0115515 A1   Apr. 30, 2015

(30) Foreign Application Priority Data

Oct. 29, 2013  (JP) ................. 2013-223984

(51) Int. Cl.
*B23Q 3/00* (2006.01)
*B23Q 1/03* (2006.01)
*B25J 9/00* (2006.01)
*B25J 19/00* (2006.01)

(52) U.S. Cl.
CPC ............... *B23Q 1/03* (2013.01); *B25J 9/0087* (2013.01); *B25J 9/0096* (2013.01); *B25J 19/0091* (2013.01); *Y10S 901/49* (2013.01)

(58) Field of Classification Search
USPC .................... 269/293, 43, 45, 271
See application file for complete search history.

(56) References Cited

U.S. PATENT DOCUMENTS

| | | | | |
|---|---|---|---|---|
| 5,903,124 A | 5/1999 | Kawakami | | |
| 6,463,356 B1 * | 10/2002 | Hattori | ................. | B62D 57/032 318/568.12 |
| 6,493,606 B2 * | 12/2002 | Saijo | ................. | G06N 3/008 318/568.1 |
| 6,901,313 B2 * | 5/2005 | Mori | .................... | B62D 57/032 180/8.1 |
| 6,980,919 B2 * | 12/2005 | Ido | ...................... | A61B 5/1038 700/245 |
| 7,099,743 B2 * | 8/2006 | Lee | ...................... | B62D 57/032 318/568.1 |
| 7,289,884 B1 * | 10/2007 | Takahashi | ............ | B25J 15/0009 318/568.12 |
| 7,378,812 B2 * | 5/2008 | Yamamoto | ........... | B62D 57/032 318/568.1 |
| 8,041,457 B2 * | 10/2011 | Ohno | ..................... | B25J 9/1612 294/106 |
| 8,868,239 B2 * | 10/2014 | Lee | ............................ | 700/245 |
| 2003/0125839 A1 * | 7/2003 | Takenaka | ............... | B62D 57/02 700/245 |
| 2003/0173926 A1 * | 9/2003 | Hattori | ................ | B62D 57/032 318/567 |
| 2005/0038560 A1 * | 2/2005 | Nagasaka | ............ | B62D 57/032 700/245 |
| 2005/0240307 A1 * | 10/2005 | Kuroki | .................. | B25J 13/085 700/245 |
| 2006/0247800 A1 * | 11/2006 | Takenaka | ............. | B62D 57/032 700/54 |
| 2008/0297091 A1 | 12/2008 | Park et al. | | |
| 2011/0178639 A1 * | 7/2011 | Kwon | .................. | B62D 57/032 700/261 |

FOREIGN PATENT DOCUMENTS

JP       58-196087 U       12/1983
JP       60-134590 U        9/1985

(Continued)

OTHER PUBLICATIONS

Extended European Search Report for Application No. EP 14 19 0454 dated Mar. 10, 2015 (6 pages).

*Primary Examiner* — Alvin Grant
(74) *Attorney, Agent, or Firm* — Harness, Dickey & Pierce, P.L.C.

(57) ABSTRACT

An abutment member having an abutment section abutting a work stand on which a workpiece to which an arm performs work is placed is provided on a front surface of a robot body.

11 Claims, 8 Drawing Sheets

(56) References Cited

FOREIGN PATENT DOCUMENTS

| JP | 01-135451 A | 5/1989 |
| JP | 04-105886 | 4/1992 |
| JP | 10-105236 A | 4/1998 |
| JP | 2007-276063 A | 10/2007 |
| JP | 2010-064198 A | 3/2010 |
| JP | 2011-051056 A | 3/2011 |
| KR | EP 2343161 A1 * | 7/2011 ............ B25J 9/1648 |

* cited by examiner

ROBOT AND ABUTMENT MEMBER FOR ROBOT

BACKGROUND

1. Technical Field

The present invention relates to a robot and an abutment member for the robot.

2. Related Art

A hanging type working robot is disclosed in JP-A-2011-51056, which includes: imaging means, at least one working arm having a joint for driving a movable section so as to be reversely input, a body section for supporting the working arm, a support member fixed and hung down so as to attach and detach a base to and from a ceiling or a wall of a working area and supporting the body section and the imaging means by a tip thereof, operation control means for recognizing a relative position of a workpiece and the working robot at the working area based on an image captured by the imaging means and performing work relative to the workpiece by the working arm based on the relative position thereof, and an output control means for reducing an output of a motor for operating the joint of the working arm when it is recognized that the work is performed while coexisting and cooperating with people.

In the invention described in JP-A-2011-51056, it is possible to easily change a height of a working position or a horizontal position of a robot by extracting and retracting a support hanging down the robot by a manual operation. However, in the invention described in JP-A-2011-51056, whenever moving a robot to a different work stand, there is a need for the user to position the robot to the work stand by manual operation and it may not be accurate positioning, and, in this case, a desired work may not be performed by the arm.

Particularly, if calibration for obtaining a position of a reference point of the robot is not performed or if the calibration is insufficient even if the calibration is performed, the accuracy is not ensured by the position in which the robot is provided and a posture thereof. Thus, for example, there is a concern that a hand used to grip a workpiece unintentionally comes into contact with the workpiece, or the workpiece or the hand itself may be damaged.

SUMMARY

An advantage of some aspects of the invention is to provide a robot in which positioning of the robot to a work stand is easily and accurately performed, and an abutment member for the robot.

An aspect of the invention is directed to a robot including: a robot body; an arm that is provided on the robot body and has a plurality of arm members and a plurality of shafts rotatably connecting two arm members; and an abutment member that is provided on a front surface of the robot body and that has a abutment section configured for abutting a work stand on which a workpiece to which the arm performs work is placed.

According to this aspect, the abutment member that has the abutment section for abutting the work stand on which the workpiece to which the arm performs work is placed is provided in the front surface of the robot body. Therefore, it is possible to easily and accurately perform the positioning between the robot and the work stand.

In the robot, the abutment member may be formed by bending a plate member and a shape formed by the abutment member and a front surface of the robot body may be a substantially polygonal shape when a state in which the abutment member is mounted on the robot body is viewed from an upper side of the robot body, and a portion of which a lateral width is the widest of the abutment member may be wider than a lateral width of the robot body. Therefore, the abutment member functions as an elastic member. Furthermore, since the abutment member returns back to an original shape after absorbing shock, it is possible to perform the positioning between the robot and the work stand.

In the robot, the shape formed by the abutment member and the front surface of the robot body may be a substantially trapezoidal shape, and the abutment section may be a portion of which a lateral width is the widest of the abutment member. Therefore, it is possible to perform the positioning between the robot and the work stand within an acceptable accuracy with respect to the work stand that is in front of the robot.

In the robot, the shape formed by the abutment member and the front surface of the robot body may be a substantially hexagonal shape. Therefore, it is possible to perform the positioning between the robot and the work stand with respect to the work stand that is in an inclined position to the robot.

In the robot, a portion of the abutment member that is provided within the robot body may be connected to the abutment section by an inclined surface that is inclined at an angle of substantially 45° with respect to the horizontal direction. Therefore, it is possible to effectively exert an effect of shock absorption and an effect of returning the deflection back to the original state.

In the robot, the robot body may have a frame and a member that is movably provided with respect to the frame, and the abutment member may be fixed to the frame. Therefore, it is possible to prevent malfunction from occurring in a movable section (portion capable of moving with respect to the frame) of the robot.

In the robot, a plurality of mounting sections on which the abutment member is mounted may be formed indifferent heights in the frame. Therefore, correspondence to the work stand at different heights is possible.

In the robot, the mounting section provided in a position that is the lowest height among the mounting sections may be formed in a position higher than a position of the center of gravity of the robot. Therefore, even if the abutment member forcefully abuts the work stand by moving the robot, it is possible to stably push back the robot by the shock.

The robot may further include a height adjustment section that adjusts the height of the abutment member. Therefore, correspondence to the work stand of different heights is possible.

In the robot, the abutment section may have a shock absorption section. Therefore, it is possible to reduce the shock applied to the robot.

In the robot, a transportation handle for transporting the robot may be provided in a rear surface of the robot body, in a position higher than the center of gravity on the inside of the frame, and in a position lower than a position in which the abutment member is fixed to the frame. Therefore, even if the abutment member abuts the work stand, the moment acting on the abutment member is reduced and it is possible to reduce the risk of the robot to fall down. Furthermore, it is possible to stably push back the robot by the shock when the abutment member abuts the work stand.

Another aspect of the invention is directed to an abutment member for a robot including: an abutment section that abuts a work stand on which a workpiece to which an arm performs work is placed; and an inclined surface one end of which is connected to the abutment section and which is inclined at an angle of approximately 45° with respect to a horizontal direction, and the abutment member is formed by bending a plate member so that a portion a lateral width of which is the widest is wider than a lateral width of the robot body. Therefore, it is possible for the abutment member to function as an elastic member and to perform the positioning between the robot and the work stand by the abutment member.

BRIEF DESCRIPTION OF THE DRAWINGS

The invention will be described with reference to the accompanying drawings, wherein like numbers reference like elements.

FIG. 4A is a plan view, and FIG. 4B is a side view.

FIG. 6A is a plan view, and FIG. 6B is a side view.

FIG. 8A is the embodiment, and FIG. 8B is a modification example.

DESCRIPTION OF EXEMPLARY EMBODIMENTS

An embodiment of the invention will be described with reference to the drawings.

Figure 1:
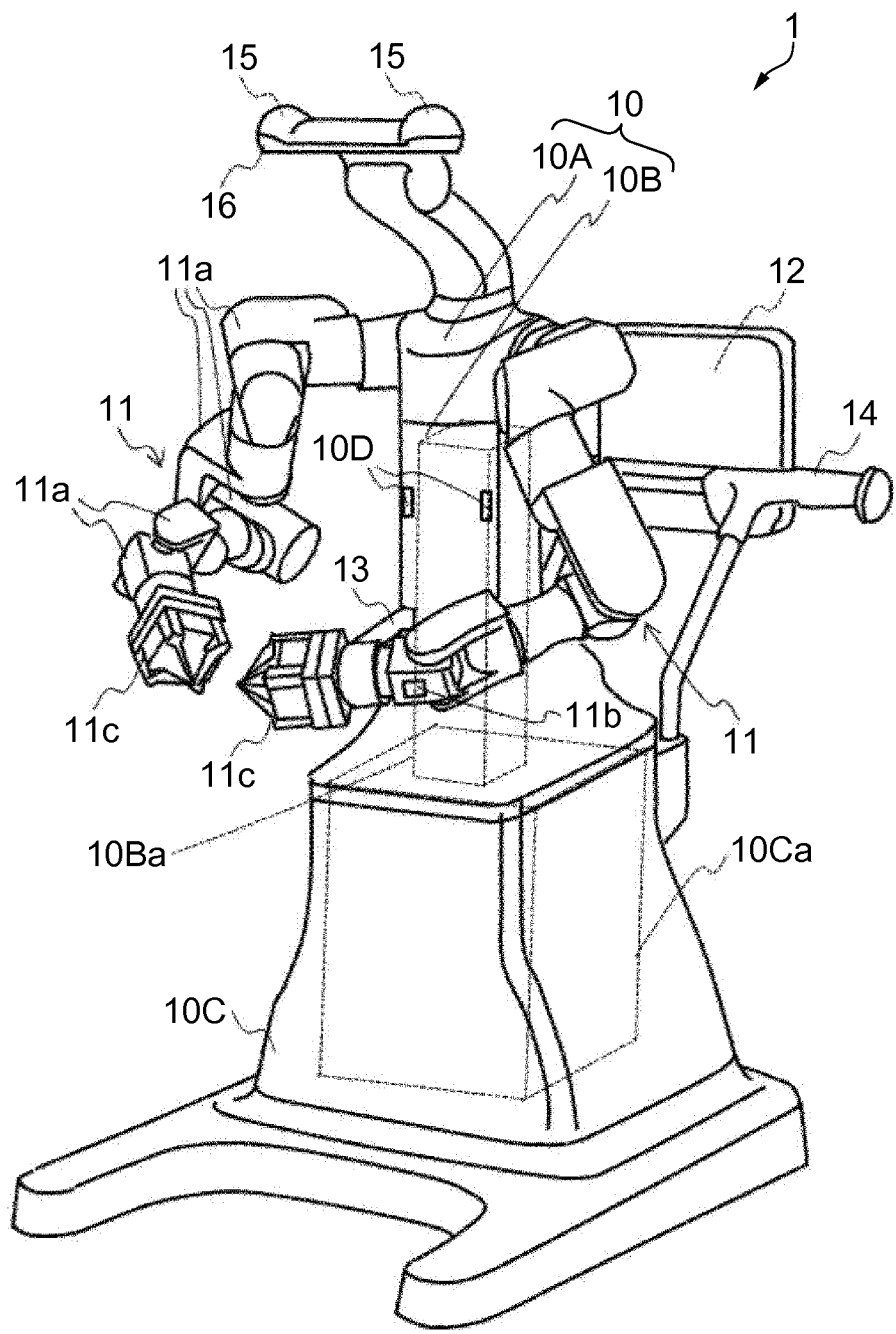
FIG. 1 is a front perspective view of a robot in a first embodiment of the invention.
Figure 2:
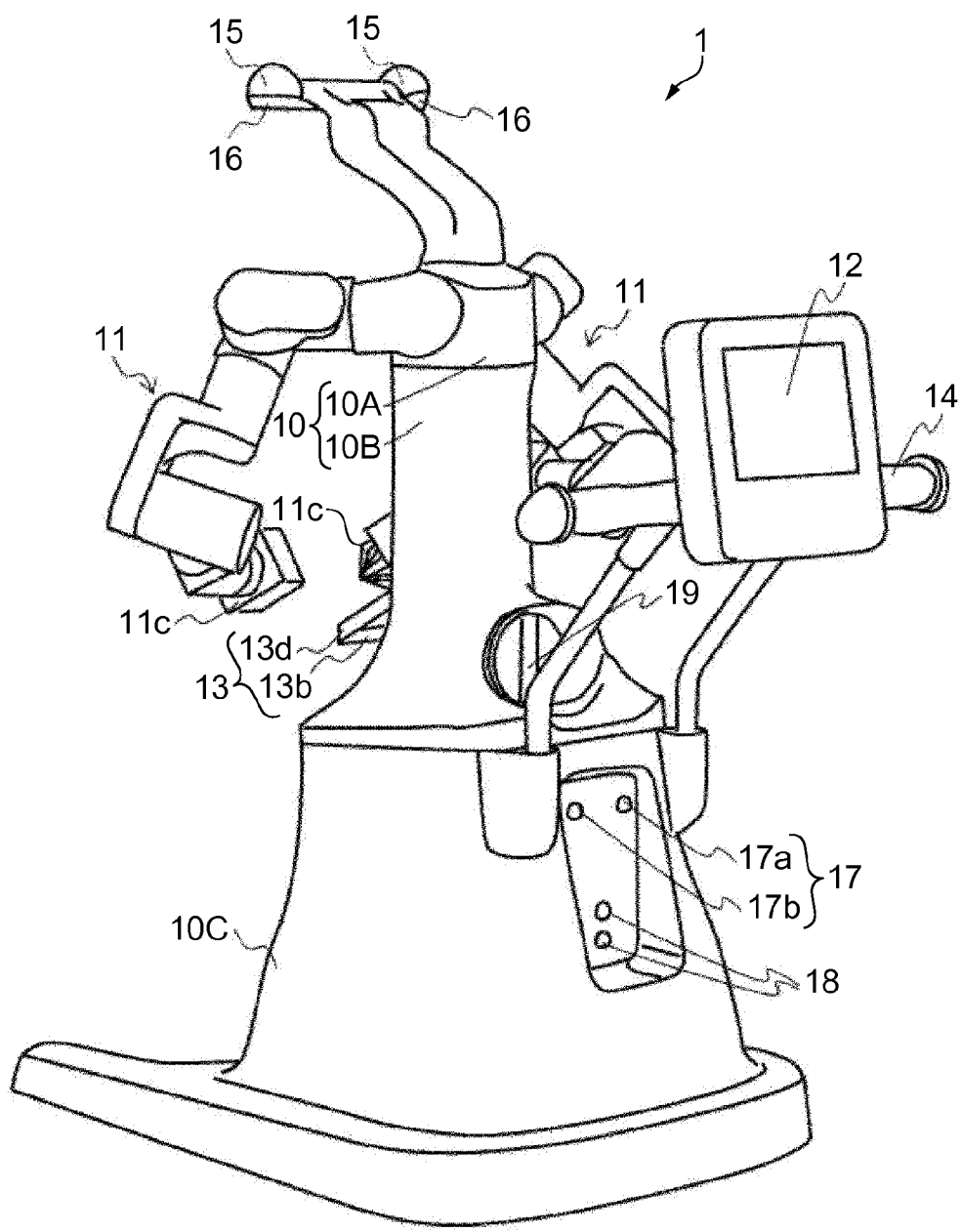
FIG. 2 is a rear perspective view of the robot.
Figure 3:
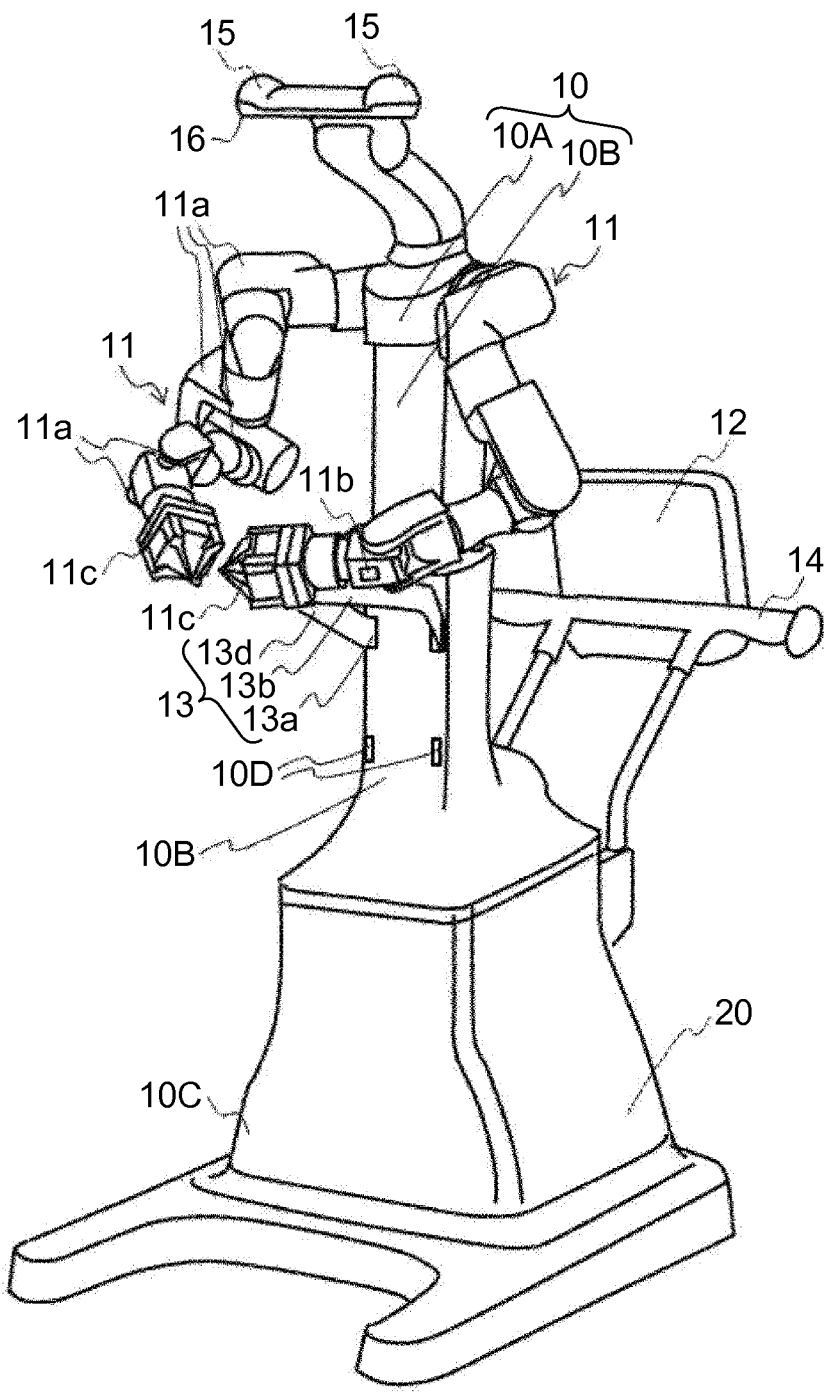
FIG. 3 is a front perspective view of the robot and illustrates a state where a shoulder section (described below) rises with respect to a state of being illustrated in FIG. 1.

FIG. 1 is a front perspective view of a robot 1 in an embodiment of the invention. FIG. 2 is a rear perspective view of the robot 1. FIG. 3 is a front perspective view of the robot 1 and illustrates a state where a shoulder section 10A (described below) rises with respect to a state of being illustrated in FIG. 1.

The robot 1 in the embodiment mainly includes a robot body 10, an arm 11, a touch panel monitor 12, a transportation handle 14, an electronic camera 15, a signal light 16, a power supply switch 17, an external I/F section 18, and a lifting handle 19. The robot body 10 mainly includes the shoulder section 10A, a body section 10B, a leg section 10C, a frame 10Ba, and a frame 10Ca. The robot 1 is a human type dual-arm robot and performs processing according to a control signal from a control section. For example, the robot 1 can be used in a manufacturing process of producing a precision apparatus such as a wristwatch, and the like. Moreover, usually, the manufacturing work is performed on a work stand (not illustrated).

Moreover, hereinafter, for convenience of description, an upper side is referred to as "upper" or "above" and a lower side is referred to as "lower" or "below" in FIGS. 1, 2, and 3. Furthermore, a front side of FIG. 1 is referred to as "front surface side" or "front surface" and a front side of FIG. 2 is referred to as "rear surface side" or "rear surface".

Each arm 11 (so called manipulator) is provided in the vicinity of an upper end of each of both sides of the shoulder section 10A.

The arm 11 is configured of a plurality of arm members 11a connected by joints (not illustrated). Actuators (not illustrated) for operating the joints are provided in the joints. For example, the actuator includes a servomotor, an encoder, or the like. An encoder value that is output from the encoder is used for feedback control of the robot 1 by the control section. Furthermore, the actuator is provided with an electromagnetic brake fixing a rotation shaft. The arm member 11a corresponds to the manipulator according to the invention and the joint corresponds to the shaft according to the invention.

A force sensor (not illustrated) is provided on a tip of the arm 11. The force sensor is a sensor that detects a force or a moment that is received as a reaction force against a force exerted by the robot 1. As the force sensor, for example, a six-axis force sensor can be used which is capable of simultaneously detecting six components of force in three translation axial directions and moment components around three rotation axes. Moreover, the force sensor is not limited to the six axes and, for example, may be three axes.

A hand 11c (so-called end effector) gripping a workpiece or a tool is provided on the tip of the arm 11. A position of an end point of the arm 11 is a position of the hand 11c. Moreover, the end effector is not limited to the hand 11c.

Furthermore, the arm 11 is provided with a hand eye camera 11b imaging the workpiece and the like placed on the work stand.

Moreover, a member that is provided in the robot 1 is not limited to the arm 11. For example, any form may be provided as long as the form is a manipulator that is configured of a plurality of joints and links, and an entirety thereof is moved by moving the joints.

The electronic camera 15 having a Charge Coupled Device (CCD), a Complementary Metal Oxide Semiconductor (CMOS), and the like and the signal light 16 are provided in a portion corresponding to a head section protruding above from the shoulder section 10A. For example, the electronic camera 15 can image the work stand and the like. For example, the signal light 16 has LEDs emitting red light, yellow light, and blue light, respectively, and the LEDs emit the light by appropriately selecting the light depending on a current state of the robot 1.

A bumper 13 is provided in the front surface (surface facing the workpiece when the robot 1 works with the arm 11) of the body section 10B. The bumper 13 is a member that constantly maintains a distance between the robot 1 and the work stand in a horizontal direction by abutting a work table to accurately perform the manufacturing work. The bumper 13 is screwed into screw holes provided in a frame inside the leg section 10C through two sets (one set is configured of two mounting sections 10D arranged in a lateral direction) of mounting sections 10D provided on the front surface of the body section 10B. The mounting section 10D is a hole having the substantially same size as that of a mounting surface 13a of the bumper 13 or a size greater than that of the mounting surface 13a. The bumper 13 corresponds to the abutment member according to the invention.

In the embodiment, two sets of the mounting sections 10D are provided in a vertical direction, but the number of the mounting sections 10D is not limited to two sets. The mounting section 10D may be one or may be more than one. If the mounting section 10D is more than one, a plurality of mounting sections 10D may be provided in different heights. The bumper 13 is described below.

The touch panel monitor 12 having a monitor that is capable of being visually recognized from a rear surface side of the robot 1 is disposed on a rear surface (surface opposite to the front surface) side of the body section 10B. The touch panel monitor 12 is provided with the transportation handle 14. For example, the monitor can display the current state of the robot 1. Furthermore, the monitor has a touch panel function and is also used as an operation section performing the setting of an operation with respect to the robot 1.

Furthermore, the lifting handle 19 is provided in the rear surface of the body section 10B. The lifting handle 19 moves the shoulder section 10A with respect to the body section 10B in the vertical direction. FIG. 1 illustrates a state where the shoulder section 10A is in the lowest position by the lifting handle 19 and FIG. 3 illustrates a state where the shoulder section 10A is in the highest position by the lifting handle 19.

In a state where the shoulder section 10A is in the lowest position as illustrated in FIG. 1, the bumper 13 is mounted so that a height of an abutment section 13b (see FIGS. 2 and 3) is lower than that of the mounting surface 13a through the mounting section 10D on the lower side among two sets of the mounting sections 10D in the vertical direction. As a result, in a state where the shoulder section 10A is in the lowest position illustrated in FIG. 1, the abutment section 13b abuts the work stand having a low height that is approximately 70 cm.

On the other hand, in a state where the shoulder section 10A is in the highest position as illustrated in FIG. 3, the bumper 13 is mounted so that the height of the abutment section 13b is higher than that of the mounting surface 13a through the mounting section 10D on the upper side among two sets of the mounting sections 10D in the vertical direction (upside down in a state of being illustrated in FIG. 1). As a result, in a state where the shoulder section 10A is in the highest position illustrated in FIG. 3, the abutment section 13b abuts the work stand having a high height that is approximately 100 cm.

As described above, in the embodiment, one bumper 13 is formed to be capable of abutting work stands having different heights. Hereinafter, a shape of the bumper 13 is described in detail.

Figure 4A:
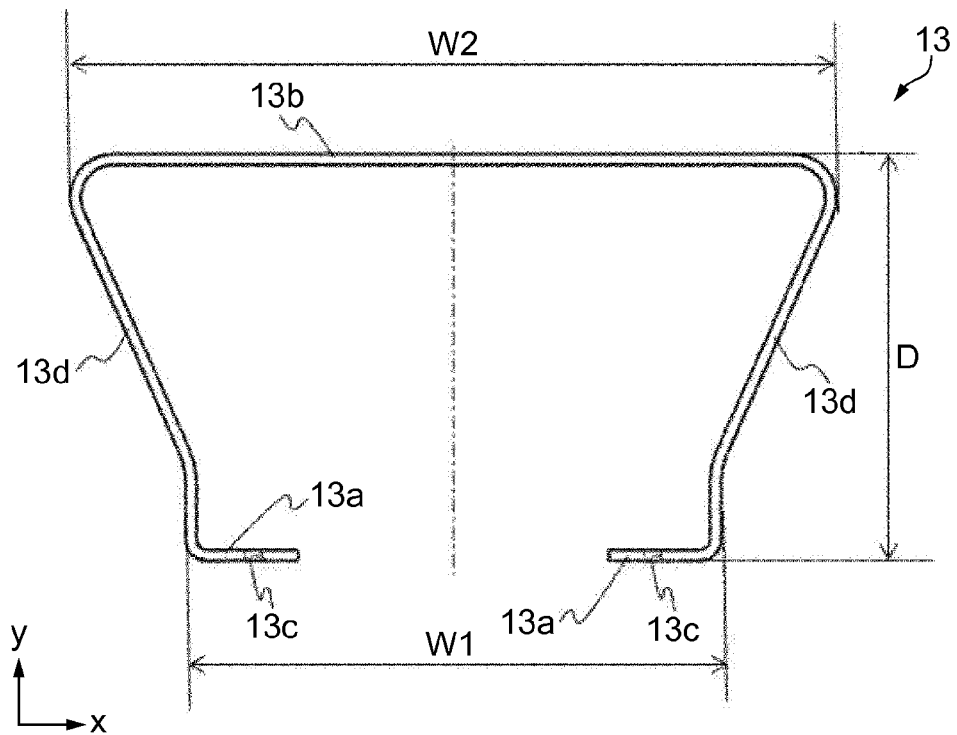
FIGS. 4A and 4B are views illustrating a bumper in detail.
Figure 4B:
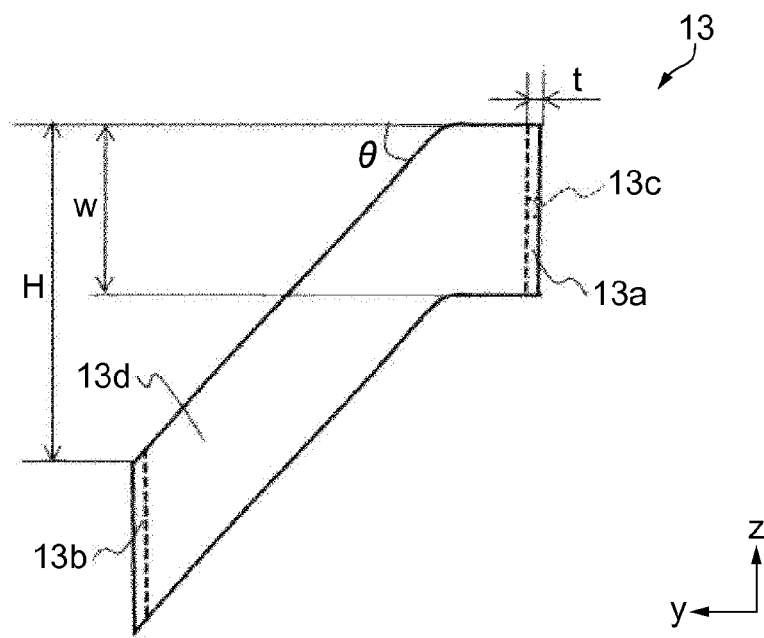

FIGS. 4A and 4B are views illustrating the shape of the bumper 13, FIG. 4A is a plan view, and FIG. 4B is a side view. The bumper 13 is formed by bending a plate member of metal having a width w and a plate thickness t. The bumper 13 mainly has mounting surfaces 13a, the abutment section 13b, holes 13c, and inclined surfaces 13d.

The mounting surfaces 13a are fixed to the frame 10Ba that is integrally configured with the frame 10Ca of the leg section 10C provided inside the body section 10B. The hole 13c is formed in the mounting surface 13a. Screws pass through the holes 13c of the mounting surfaces 13a from the abutment section 13b side and the screws are tightened into screw holes formed in the frame 10Ba so that the bumper 13 is fixed to the frame 10Ba. Therefore, it is possible to prevent malfunction from occurring in the movable section (portion such as the rotation shaft (described below) or the shoulder section 10A that are provided to be capable of moving with respect to the frame 10Ba and the frame 10Ca) of the robot 1. Furthermore, it is possible to directly transmit the shock applied to the bumper 13 to the robot 1 and to move the robot 1 by the shock when casters (described below) are grounded.

A width (maximum value in an x direction) W1 between both ends of the mounting surfaces 13a is formed so as to be substantially the same as that of the frame 10Ba. Here, the substantially same is a concept including an error to some extent (for example, 10%) in addition to only the case of being the same.

Moreover, in the embodiment, the mounting surfaces 13a are divided into two, but an integral mounting surface may be formed by connecting two mounting surfaces 13a.

The abutment section 13b is substantially parallel to the mounting surfaces 13a and is formed such that a distance between the abutment section 13b and the mounting surface 13a is a depth D. The abutment section 13b is a portion the lateral width of which is the widest of the bumper 13. Here, the lateral width is a width in a lateral direction of the robot 1 when mounting the bumper 13 on the robot 1. In the embodiment, the abutment section 13b is a planer shape (having a surface), but may be a rod shape. Moreover, substantially parallel is a concept including an error to some extent (for example, 10%) in addition to only a case of being completely parallel.

The abutment section 13b has a width W2 that is wider than a width W1 between both ends of the mounting surfaces 13a and the shape thereof is a substantially trapezoidal shape (two mounting surfaces 13a are connected by an imaginary line) when the bumper 13 is viewed from above (above the robot 1). Furthermore, since the bumper 13 is formed by the plate member, even if the work stand abuts the abutment section 13b and a load is applied to the bumper 13, the inclined surfaces 13d are deflected and the depth D (distance in a y direction) is changed, thereby absorbing the shock. Moreover, the substantially trapezoidal shape is not limited to the trapezoidal shape and is a concept including a shape having a curved portion on a side or having a rounded shape on a corner.

Here, the width W1 and the width W2 are described. If a width of the shoulder section 10A is approximately 500 mm, it is preferable that position shift (horizontal direction) between the work stand and the robot 1 be approximately 10 mm. Then, an allowable range of β (equal to an allowable inclination of β for mounting the bumper 13) for the angle deviation (horizontal direction) between the work stand and the robot 1 is obtained from tan β=10 mm/500 mm.

Since a mechanical system of the depth D is approximately ±1.5 mm, it is necessary to consider an error of approximately 3 mm. Therefore, the width W2 of the bumper 13 is calculated to be approximately 172 mm from tan β=3/W2. Therefore, the width W2 may be approximately 172 mm or more. In the embodiment, the width W2 is 200 mm.

The width W1 of the bumper 13 considering the width of the frame 10Ba is 158 mm. Therefore, from the point of view of acceptable accuracy, it is revealed that the width W2 should be wider than the width W1.

Furthermore, since the bumper 13 is formed of metal, the inclined surface 13d returns back to the original shape even after being deflected. Therefore, the distance (here, D) between the abutment section 13b and the body section 10B is constantly maintained.

Since the mounting surfaces 13a and the abutment section 13b are different in positions in a height z direction, the mounting surfaces 13a and the abutment section 13b are connected by the inclined surfaces 13d. One end of the inclined surface 13d is connected to the abutment section 13b and the other end thereof is connected to the mounting surface 13a. A difference H between the mounting surface 13a and the abutment section 13b in the height z direction is arbitrary, but when considering an effect of shock absorption and an effect of returning the deflection back to the original state, it is preferable that an angle θ between the inclined surface 13d and the horizontal direction be near 45° (approximately 45°). In the embodiment, θ is 47°. Moreover, "near" or "approximately" in "near 45°", "approximately 45°", or the like is intended to indicate that it is not limited to a case of being completely matched, and is a concept including an error of a few degrees. For example, near 45° or approximately 45° is not limited to 45° and is a concept including an error of a few degrees.

Moreover, the width w and the plate thickness t of the bumper 13 are determined by considering the effect of shock absorption and the effect of returning the deflection back to the original state so that the bumper 13 functions as the elastic member. Furthermore, a shock absorption section (for example, sponge, rubber, and the like) for absorbing the shock may be provided on the front surface (side abutting the work stand) of the abutment section 13b.

The difference H between the mounting surface 13a and the abutment section 13b in the height z direction is determined by the difference (in the embodiment, since it corresponds to the work stand of approximately 70 cm and the work stand of approximately 100 cm, the difference is approximately 30 cm) between the height of the mounting section 10D and the height of the corresponding work stand. The angle θ between the inclined surface 13d and the horizontal direction may not be near 45° depending on the widths W1, W2, and the depth D. In this case, it is preferable that the widths W1, W2, the depth D, and the height H be set so that the angle θ between the inclined surface 13d and the horizontal direction is smaller than 45°.

In the embodiment, it is possible to steplessly adjust the height of the shoulder section 10A by the lifting handle 19. Therefore, correspondence to the work stand having any height is possible by adjusting the height of the shoulder section 10A and the position of the mounting section 10D on which the bumper 13 is mounted, if the work stand has a height (in the embodiment, a height between approximately 70 cm to 100 cm) between a height of the work stand capable of corresponding when the shoulder section 10A is in the lowest position and a height of the work stand capable of corresponding when the shoulder section 10A is in the highest position.

Description is returned to FIGS. 1 to 3. The body section 10B is provided on the frame 10Ca inside the leg section 10C. A control section that controls the robot 1 itself and the like are provided inside the frame 10Ca. The frame 10Ca and the frame 10Ba are integrally configured. The frame 10Ca is provided with a rotating shaft (not illustrated) and the rotating shaft is vertically movably provided inside the frame 10Ba. Moreover, the shoulder section 10A is provided in an upper end portion of the rotating shaft and the rotating shaft is vertically moved by the lifting handle 19.

The power supply switch 17 and the external I/F section 18 that is an external connection terminal connecting the control section and an external PC etc. are provided in the rear surface of the leg section 10C. The power supply switch 17 has a power supply ON switch 17a inputting power of the robot 1 and a power supply OFF switch 17b blocking power of the robot 1.

Furthermore, the transportation handle 14 is provided in the rear surface of the leg section 10C. A connection position between the transportation handle 14 and the leg section 10C is positioned in a position higher than the center of gravity inside the frame 10Ca. Furthermore, the connection position between the transportation handle 14 and the leg section 10C is positioned in a position lower than the mounting section 10D. The position of the transportation handle 14 that is gripped by an operator is positioned in a position higher than the connection position between the transportation handle 14 and the leg section 10C.

Furthermore, a plurality of casters and adjustable feet (both are not illustrated) are disposed in the lowest portion of the leg section 10C having gaps in the horizontal direction. Thus, the operator can move and transport the robot 1 by pressing the transportation handle 14, and can fix the robot 1.

Moreover, a main configuration of the robot 1 is described for the features of the embodiment, and the invention is not limited to the above description. It is not intended to exclude a configuration included in a general gripping robot. For example, the seven-axis arm is illustrated in FIGS. 1 to 3, but the number of axes (number of joints) may be further increased and decreased. The number of arm members may be increased and decreased. Furthermore, shapes, sizes, arrangements, structures, and the like of various members such as the arm member and the joint may be also appropriately changed. Furthermore, in the embodiment, the control section is provided inside the frame 10Ca, but may be provided outside the robot 1. If the control section is provided outside the robot 1, the control section is connected to the robot 1 through the external I/F section 18 by cable or radio.

Figure 5:
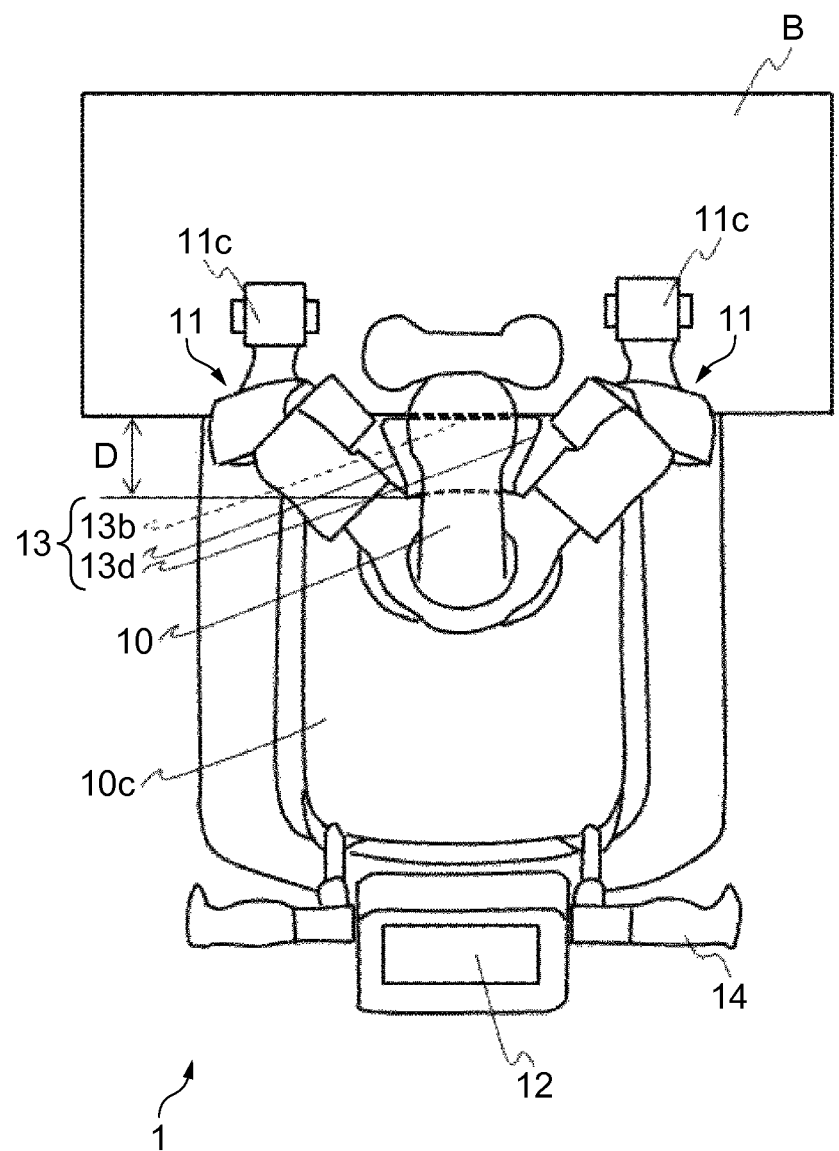
FIG. 5 is a view of the robot viewed from above.

Next, a method for positioning the work stand of such a robot 1 and the robot 1 will be described with reference to FIG. 5. FIG. 5 is a view of the robot 1 viewed from above the robot 1.

In a state where the adjustable feet are lifted up and the casters are grounded, the operator presses the transportation handle 14 and the abutment section 13b abuts a side surface (edge) of the work stand B.

After the inclined surfaces 13d are deflected by the shock when the abutment section 13b abuts the work stand B, the inclined surfaces 13d return back to the original shape. Since the casters are attached to the robot 1, when the bumper 13 returns back to the original shape, the robot 1 moves back (lower direction in FIG. 5).

As a result, as illustrated in FIG. 5, the gap between the front surface of the body section 10B and the work stand B is maintained to be D. If the robot 1 is stopped and grounding of the casters is released by lowering the adjustable feet, the robot 1 is placed on a floor in a state where the gap between the front surface of the body section 10B and the work stand B is maintained to be D (positioned).

According to the embodiment, it is possible to easily and accurately perform the positioning between the robot 1 and work stand so that the distance between the robot 1 (front surface of the robot body 10, that is the center of the rotating shaft) and work stand becomes a predetermined distance. Furthermore, correspondence to the work stands having various heights is possible by providing the plurality of mounting sections 10D mounting the bumper 13 in different heights.

Furthermore, according to the embodiment, correspondence to the work stand having any height is possible by adjusting the height of the shoulder section 10A and the position of the mounting section 10D on which the bumper 13 is mounted, if the work stand has a height between the height of the work stand capable of corresponding when the shoulder section 10A is in the lowest position and the height of the work stand capable of corresponding when the shoulder section 10A is in the highest position. Furthermore, since the inclined section is provided in the bumper 13, correspondence to the work stands having different heights is possible, even if the quantity of mounting sections 10D is one. Moreover, correspondence to various types (different heights) of the work stands is more flexibly possible by providing the plurality of mounting sections 10D and adjusting the mounting position of the bumper 13.

Furthermore, according to the embodiment, since the mounting section 10D on the lower side among the plurality of mounting sections 10D is provided in a position higher than the center of gravity of the body section 10B inside the frame 10Ca and the connection position between the transportation handle 14 and the leg section 10C is provided in a position lower than the mounting section 10D, it is possible to comfortably move the robot 1 and to abut the bumper 13 to the work stand by pressing the transportation handle 14 by the operator. Then, it is possible to reduce the moment acting on the bumper 13 and to reduce risk of falling down of the robot 1 even if the bumper 13 abuts the work stand. Furthermore, it is possible to stably push back the robot 1 by the shock when the bumper 13 abuts the work stand.

Furthermore, according to the embodiment, since accurate positioning can be performed by the bumper 13, it is possible to reduce a burden on the calibration.

Since the robot 1 is positioned by the adjustable feet, if the bumper 13 is not used, accuracy of the positioning is unlikely to appear compared to a case of being fixed to the floor by bolts and the like and it is necessary to perform accurate calibration. Particularly, in the accurate calibration in which the calibration precision is within ±0.2 mm, the necessary time required for the calibration is at least several hours (may take more than one day).

On the other hand, since accurate positioning can be performed by using the bumper 13, it is possible to easily perform the calibration. For example, the time required for simple calibration in which the calibration precision is within ±2 mm is approximately few minutes to several tens of minutes. Therefore, it is possible to obtain the accuracy that is sufficient for practical use and to significantly reduce work time by performing accurate positioning by using the bumper 13 and performing the calibration with simple calibration.

Moreover, in the embodiment, the width W2 (maximum value in the x direction) of the abutment section 13b is wider than the width W1 (maximum value in the x direction) of both ends of the mounting surfaces 13a and the shape of the bumper 13 is formed so as to be a substantially trapezoidal shape when viewed from above the bumper 13, but the shape of the bumper is not limited to the embodiment.

Figure 6A:
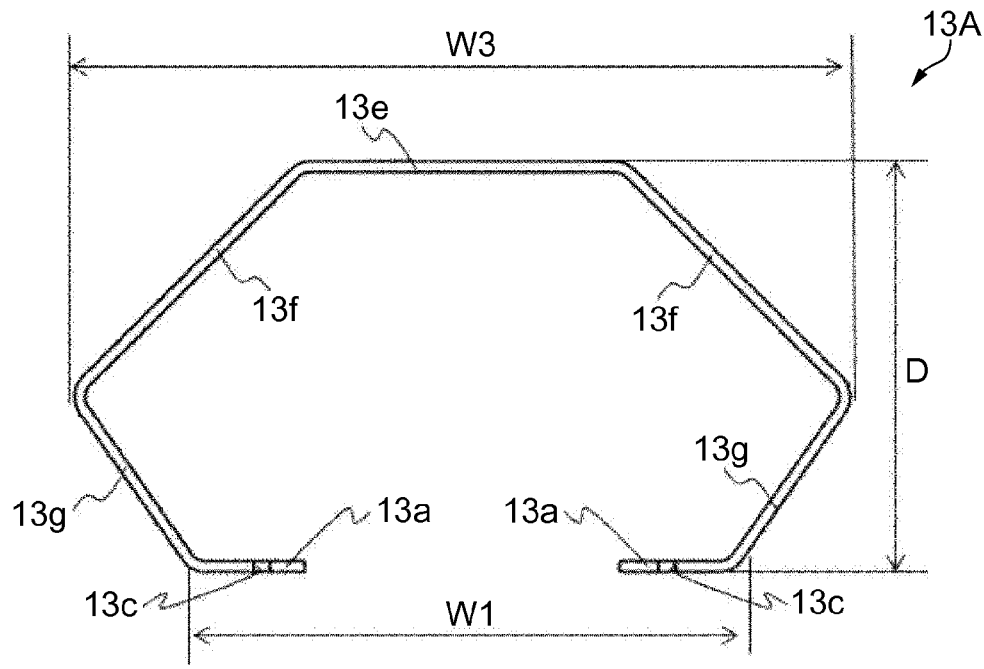
FIGS. 6A and 6B are views illustrating a bumper of a modification example in detail.
Figure 6B:
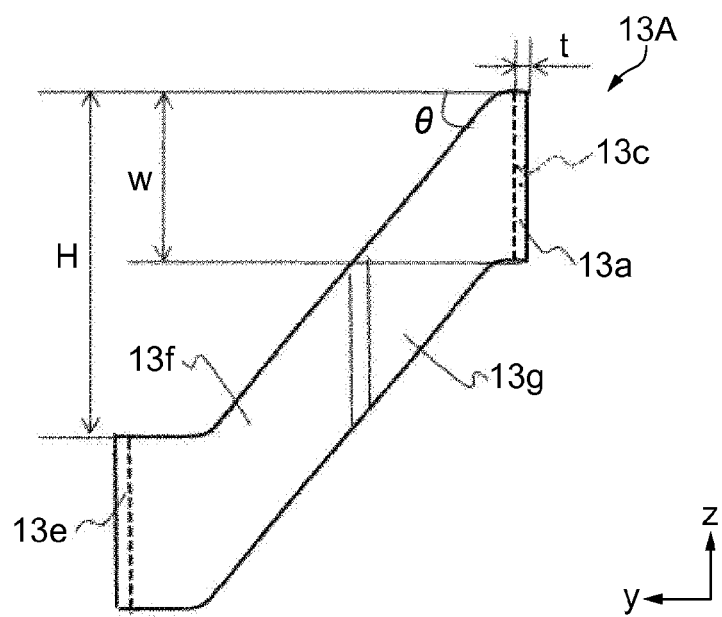

FIGS. 6A and 6B are views illustrating a bumper 13A of a modification example and FIG. 6A is a plan view. Since a side view is substantially the same as FIG. 4B, the description thereof will be omitted. Furthermore, the same reference numerals are given to the same portions as the bumper 13 and the description thereof will be omitted. The bumper 13A corresponds to the abutment member according to the invention.

The bumper 13A mainly has mounting surfaces 13a, the holes 13c, a first abutment section 13e, second abutment sections 13f, and inclined surfaces 13g.

The first abutment section 13e is substantially parallel to the mounting surfaces 13a and a distance between the first abutment section 13e and the mounting surfaces 13a is formed so as to be a depth D. A lateral width of the first abutment section 13e is smaller than a width W1 of both ends of the mounting surfaces 13a.

The second abutment sections 13f are formed on both ends of the first abutment section 13e so as to form an arbitrary angle γ between the second abutment section 13f and the first abutment section 13e when the bumper 13A is viewed from above (+z direction). The second abutment section 13f is a portion having the widest lateral width of the bumper 13A.

A width W3 of the second abutment sections 13f is wider than the width W1 of both ends of the mounting surfaces 13a, and the second abutment sections 13f are formed so that the shape of the bumper 13A when viewed from above (above the robot 1) is a substantially hexagonal shape. The substantially hexagonal shape is not limited to the hexagonal shape and is a concept which includes a shape having a curved portion on a side or having a rounded shape on a corner.

Since the mounting surfaces 13a and the first abutment section 13e are different in positions in a height z direction, the mounting surfaces 13a and the first abutment section 13e are connected by the inclined sections of the second abutment sections 13f and the inclined surfaces 13g. One end of the inclined surface 13g is connected to the second abutment section 13f and the other end thereof is connected to the mounting surface 13a.

If the first abutment section 13e abuts the work stand and a load is applied to the bumper 13A, the second abutment sections 13f and the inclined surface 13g are deflected, thereby the shock is absorbed and the bumper 13A returns back to the original shape by elasticity. Furthermore, if the second abutment section 13f abuts the work stand and a load is applied to the bumper 13A, the first abutment sections 13e and the inclined surface 13g are deflected, thereby the shock is absorbed and the bumper 13A returns back to the original shape by elasticity.

Moreover, a height H between the mounting surface 13a and the second abutment section 13f in the height z direction is arbitrary, but when considering the effect of shock absorption and the effect of returning the deflection back to the original state, it is preferable that an angle θ between the inclined surface 13d and the horizontal direction be near 45°.

Figure 7:
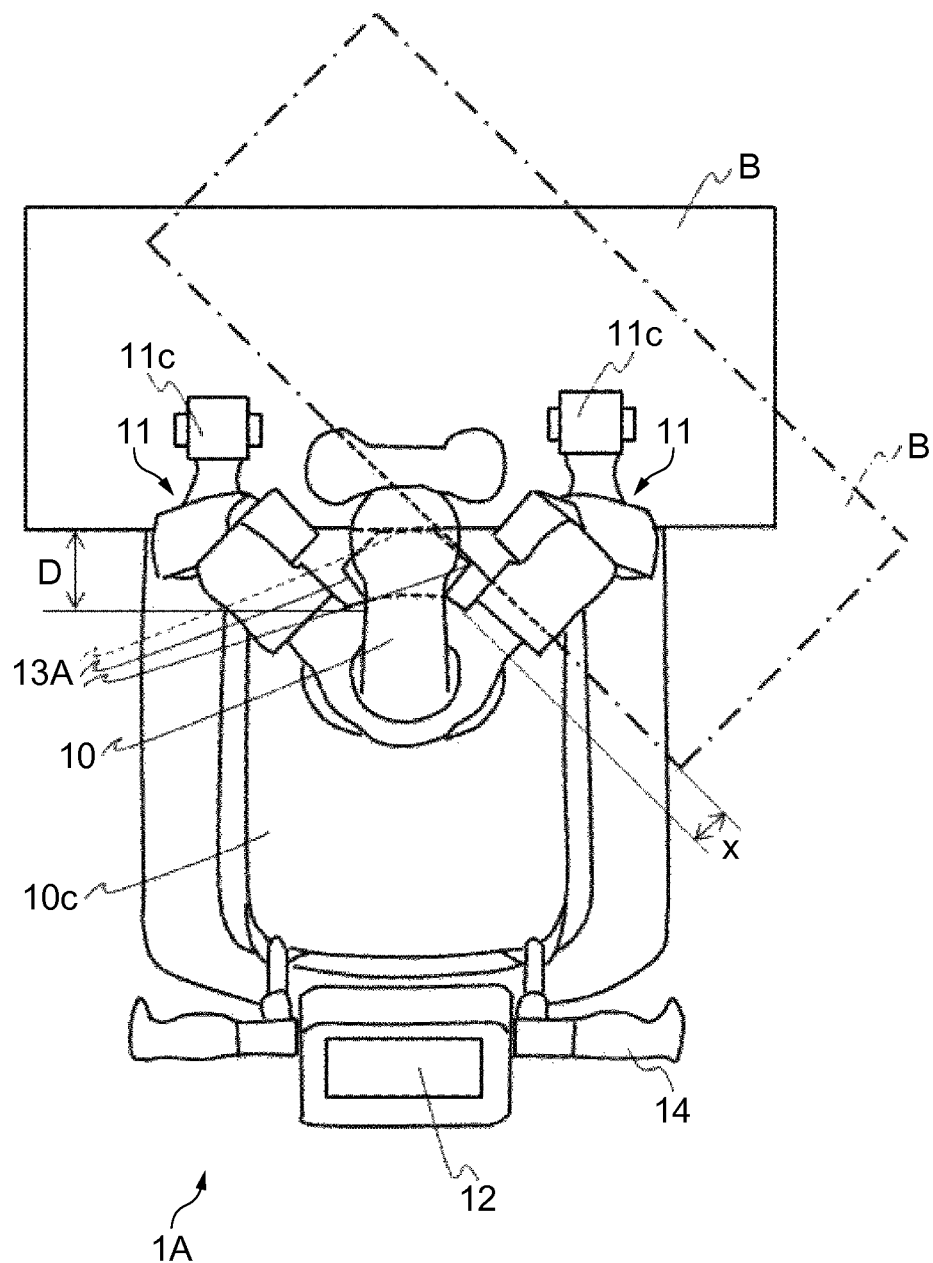
FIG. 7 is a view of the robot viewed from above.

FIG. 7 is a view of a robot 1A in which the bumper 13A is provided when viewed from above.

First, a case where the work stand is provided in the front surface of the robot 1A will be described. In a state where adjustable feet are lifted up and casters are grounded, the operator presses a transportation handle 14 and the first abutment section 13e abuts a work stand B (represented by a solid line in FIG. 7).

After the second abutment sections 13f and the inclined surfaces 13g are deflected by the shock when the first abutment section 13e abuts the work stand B (represented by the solid line in FIG. 7), the second abutment sections 13f and the inclined surfaces 13g return back to the original shape. Since the casters are attached to the robot 1A, when the bumper 13A returns back to the original shape, the robot 1A moves back. As a result, as illustrated in FIG. 7, the gap between the front surface of the body section 10B and the work stand B (represented by a solid line in FIG. 7) is maintained to be D.

Next, a case where the work stand B (represented by a one-dotted chain line in FIG. 7) exists in an inclined position with respect to the robot 1A will be described. In a state where the adjustable feet are lifted up and the casters are grounded, the operator presses the transportation handle 14 and the second abutment section 13f abuts the work stand B (represented by the one-dotted chain line in FIG. 7).

After the first abutment sections 13e and the inclined surfaces 13g are deflected by the shock when the second abutment section 13f abuts the work stand B (represented by the one-dotted chain line in FIG. 7), the first abutment sections 13e and the inclined surfaces 13g return back to the original shape. Since the casters are attached to the robot 1A, when the bumper 13A returns back to the original shape, the robot 1A moves back. As a result, as illustrated in FIG. 7, the gap between the front surface of the body section 10B and the work stand B (represented by the one-dotted chain line in FIG. 7) is maintained to be X.

If the robot 1A is stopped and grounding of the casters is released by lowering the adjustable feet, the robot 1A is placed on a floor in a state where the robot 1A is positioned.

Moreover, in the bumpers 13 and 13A, the shape of the bumpers 13 and 13A (robots 1 and 1A) are substantially trapezoidal shape and substantially hexagonal shape when viewed from above, but the shape of the bumper is not limited to the embodiments. If the portion having the widest lateral width of the bumper is wider than the lateral width (in the bumpers 13 and 13A, the width W1 of the mounting surface 13a) of the body section 10B and the shape of the bumper is a substantially polygonal shape when the bumper (robot) is viewed from above, the bumper can exert a function as the positioning member and a function as the elastic member. For example, the polygonal shape satisfying the conditions includes a substantially trapezoidal shape, a substantially hexagonal shape, a substantially octagonal shape, a substantially dodecagonal shape, and the like. Here, the substantially polygonal shape is not limited to a case of completely matching the polygonal shape. For example, the substantially polygonal shape is not limited to the polygonal shape made of straight lines and is a concept including a shape having a curved portion on a side or having a rounded shape on a corner.

Furthermore, in the embodiment, the bumpers 13 and 13A are formed by bending the plate member but is not limited to the plate member if the function as the elastic member is included. For example, the mounting surface 13a and the abutment section 13b may be connected by an elastic member such as a spring.

Figure 8A:
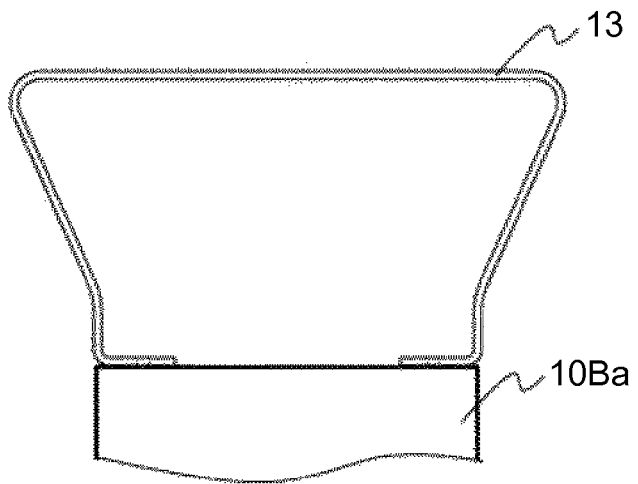
FIGS. 8A and 8B are views illustrating a mounting method of the bumper.
Figure 8B:
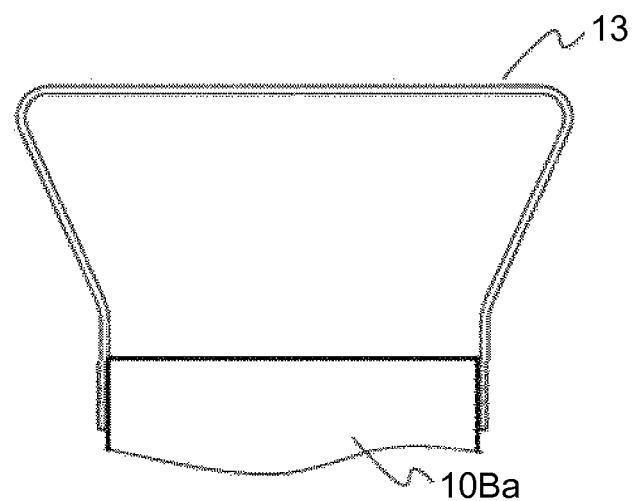

Furthermore, in the embodiment, the bumpers 13 and 13A are provided on the front surface of the robot body 10 by screwing (see FIG. 8A) the bumpers 13 and 13A from the front surface to the frame inside the body section 10B, but the position in which the bumpers 13 and 13A are fixed to the frame 10Ba is not limited to the front surface. For example, as illustrated in FIG. 8B, the bumper 13 may be screwed to the side surface of the frame 10Ba inside the body section 10B. In this case, the portion having the widest lateral width of the bumper 13 may be wider than the lateral width of the body section 10B and the shape formed by the bumper 13 and the front surface of the frame 10Ba may be a substantially polygonal shape when the bumper 13 (robot 1) is viewed from above.

Furthermore, in the embodiment, the bumpers 13 and 13A are provided in the front surface of the robot body 10, but provision of the bumpers 13 and 13A is not limited to the front surface of the robot body 10. For example, the bumpers 13 and 13A may be provided in the side surface of the robot body 10. Thus, the positioning between the robot body 10 (rotating shaft) and the work stand that is provided in the lateral side of the robot 1 can be performed and, for example, the shoulder section 10A is rotated. Thus, it is suitable when performing the work on the work stand that is provided in the lateral side of the robot 1.

Furthermore, in the embodiment, correspondence to the work stand having any height is also steplessly possible by steplessly adjusting the height of the shoulder section 10A by the lifting handle 19 and by adjusting the position of the mounting section 10D on which the bumper 13 is mounted, if the work stand has a height (in the embodiment, the height between approximately 70 cm to 100 cm) between the height of the work stand capable of corresponding when the shoulder section 10A is in the lowest position and the height of the work stand capable of corresponding when the shoulder section 10A is in the highest position, but the configuration corresponding to work stands having various heights is not limited to the embodiments. For example, a configuration may be formed in which the height of the mounting section 10D is changed simultaneously with the shoulder section 10A by the lifting handle 19. In the embodiment, the lifting handle 19 is manually operated, but may be automatically operated (using the actuator and the like). The configuration to change the height of the lifting handle 19 and the mounting section 10D, and the like correspond to the height adjustment section according to the invention.

The invention has been described by way of the embodiments, but the technical scope of the invention is not limited to the scope described in the above embodiments. It is obvious to those skilled in the art that various changes or improvements may be performed to the above embodiments. Furthermore, it is obvious from the description of the appended claims that forms to which such changes and improvements are added are included in the technical scope of the invention.

Furthermore, in the description of the invention, "approximately" and "near" are not limited to being completely matched and mean to include forms capable of obtaining the problems and the objects thereof.

The entire disclosure of Japanese Patent Application No. 2013-223984, filed Oct. 29, 2013 is expressly incorporated by reference herein.

What is claimed is:

1. A robot comprising:
   a robot body;
   an arm that is provided on the robot body; and
   an abutment member that is provided on the robot body and that has an abutment section configured for abutting a work stand,
   wherein the robot body has a frame and a member that is movably provided with respect to the frame, and
   wherein the abutment member is fixed to the frame.

2. The robot according to claim 1,
   wherein a shape formed by the abutment member and a front surface of the robot body is a substantially polygonal shape when a state in which the abutment member is mounted on the robot body is viewed from an upper side of the robot body, and
   wherein a portion of the abutment member, which has the widest lateral width, is wider than a lateral width of the robot body.

3. The robot according to claim 2,
   wherein the shape formed by the abutment member and the front surface of the robot body is a substantially trapezoidal shape, and
   wherein the abutment section is the portion of the abutment member which has the largest lateral width.

4. The robot according to claim 2,
   wherein the shape formed by the abutment member and the front surface of the robot body is a substantially hexagonal shape.

5. The robot according to claim 1,
   wherein a portion of the abutment member that is provided within the robot body is connected to the abutment section by an inclined surface that is inclined at an angle of substantially 45° with respect to the horizontal direction.

6. The robot according to claim 1,
wherein a plurality of mounting sections on which the abutment member is mounted are formed in different heights in the frame.

7. The robot according to claim 6,
wherein the mounting section provided in a position that is the lowest height among the mounting sections is formed in a position higher than a position of the center of gravity of the robot.

8. The robot according to claim 1, further comprising:
a height adjustment section that adjusts the height of the abutment member.

9. The robot according to claim 1,
wherein the abutment section has a shock absorption section.

10. The robot according to claim 1,
wherein a transportation handle for transporting the robot is provided in a rear surface of the robot body, in a position higher than the center of gravity on the inside of the frame, and in a position lower than a position in which the abutment member is fixed to the frame.

11. An abutment member of a robot having a robot body comprising:
an abutment section that abuts a work stand on which a workpiece to which an arm performs work is placed; and
an inclined surface one end of which is connected to the abutment section and which is inclined at an angle of approximately 45° with respect to a horizontal direction,
wherein the abutment member is formed by bending a plate member so that a portion of the abutment member, which has a widest lateral width, is wider than a lateral width of the robot body, and the portion having the widest lateral width defines the abutment section.

* * * * *